US006617577B2

(12) United States Patent
Krutchinsky et al.

(10) Patent No.: US 6,617,577 B2
(45) Date of Patent: Sep. 9, 2003

(54) METHOD AND SYSTEM FOR MASS SPECTROSCOPY

(75) Inventors: Andrew Krutchinsky, New York, NY (US); Herbert Cohen, New York, NY (US); Markus Kalkum, New York, NY (US); Vadim Sherman, Brooklyn, NY (US); Brian Chait, New York, NY (US)

(73) Assignee: The Rockefeller University, New York, NY (US)

( * ) Notice: Subject to any disclaimer, the term of this patent is extended or adjusted under 35 U.S.C. 154(b) by 0 days.

(21) Appl. No.: 09/835,943

(22) Filed: Apr. 16, 2001

(65) Prior Publication Data

US 2002/0148972 A1 Oct. 17, 2002

(51) Int. Cl.[7] .......................... B01D 59/44; H01J 49/00
(52) U.S. Cl. ........................ 250/292; 250/282; 250/288
(58) Field of Search ................................ 250/282, 288, 250/292

(56) References Cited

U.S. PATENT DOCUMENTS

| | | | | |
|---|---|---|---|---|
| 4,861,965 A | | 8/1989 | Stava | |
| 4,861,988 A | | 8/1989 | Henion et al. | |
| 4,935,624 A | | 6/1990 | Henion et al. | |
| 5,179,278 A | | 1/1993 | Douglas | |
| 5,672,868 A | | 9/1997 | Mordehai et al. | |
| 5,818,055 A | | 10/1998 | Franzen | |
| 5,869,829 A | | 2/1999 | Dresch | |
| 5,965,884 A | | 10/1999 | Laiko et al. | |
| 6,020,586 A | | 2/2000 | Dresch et al. | |
| 6,040,423 A | | 3/2000 | Frank et al. | |
| 6,075,244 A | | 6/2000 | Baba et al. | |
| 6,107,623 A | | 8/2000 | Bateman et al. | |
| 6,111,250 A | | 8/2000 | Thomson et al. | |
| 6,121,607 A | | 9/2000 | Whitehouse et al. | |
| 6,392,225 B1 | * | 5/2002 | Schwartz et al. | 250/292 |
| 6,483,109 B1 | * | 11/2002 | Reinhold et al. | 250/292 |

FOREIGN PATENT DOCUMENTS

| | | |
|---|---|---|
| WO | WO 99/38185 | 7/1999 |

OTHER PUBLICATIONS

Author: Krutchinsky et al.; Title: "Rapidly Switchable Matrix–Assisted Laser Desorption/Ionization and Electrospray Quadrupole–Time–Of–Flight Mass Spectrometry for Protein Identification"; *American Society for Mass Spectrometry*, vol. 11, p. 493–504; Date of Publication: Unknown but copyrighted in 2000; Place of Publication: United States.

Author: Borman; Title: "Combinatorial Synthesis Hits The Spot", *Chemical and Engineering News*, vol. 78, No. 27, p. 25–27; Date of Publication: Jul. 3, 2000; Place of Publication: United States.

(List continued on next page.)

*Primary Examiner*—John R. Lee
*Assistant Examiner*—Paul M. Gunzo
(74) *Attorney, Agent, or Firm*—Irving N. Feit; Hoffmann & Baron, LLP

(57) ABSTRACT

A system for determining the ratio of mass to charge of an ion including a pulsed ionizer, a high pressure co-linear ion guide/accelerator, and a mass analyzer. The pulsed ionizer generates intact analyte ions from a sample of matter to be analyzed. The high pressure co-linear ion guide/accelerator is interfaced with the ion source for receipt of the intact ions of the sample. The ion guide/accelerator simultaneously dampens and linearly accelerates the intact ions in the substantial absence of fragmentation of the ions to provide a substantially continuous beam of the intact ions for mass analysis. The mass analyzer is connected to the ion guide/accelerator for receipt of the beam of ions and determines the mass to charge ratio of the intact ions.

73 Claims, 10 Drawing Sheets

OTHER PUBLICATIONS

Author: Cha et al.; Title: "An interface with a Linear Quadrupole Ion Guide for an Electrospray–Ion Trap Mass Spectrometer System"; *American Chemical Society*, vol. 72, No. 22, pp. 5647–5654; Date of Publication: Oct. 14, 2000; Place of Publication: Internet.

Author: Baykut et al.; Title: "Matrix–assisted laser desorption/ionization Fourier transform ion cyclotron resonance mass spectrometry with pulsed in–source collision gas and in–source ion accumulation"; *Rapid Communications in Mass Spectrometry*, vol. 14, pp. 1238–1247; Date of Publication: Unknown but Copyrighted in 2000; Place of Publication: United States.

Author: Laiko et al.; Title: "Atmospheric Pressure MALDI/Ion Trap Mass Spectrometry" *Analytical Chemistry*, vol. 72, No. 21, p. 5239–5243; Date of Publication: Sep. 23, 2000; Place of Publication: Internet.

Author: Doroshenko et al.; Title: "Injection of Externally Generated Ions into an Increasing Trapping Field of a Quadrupole Ion Trap Mass Spectrometer" *Journal of Mass Spectrometry*, vol. 31, pp. 602–615; Date of Publication: Unknown but Copyrighted in 1997; Place of Publication: United States.

Author: Jonscher et al.; Title: "Matrix–assisted Laser Desorption Ionization/Quadrupole Ion Trap Mass Spectrometry of Peptides" *Journal of Biological Chemistry*, vol. 272, No. 3, pp. 1735–1741; Date of Publication: Jan. 17, 1997; Place of Publication: United States.

Author: Qin et al.; Title: "Identification and Characterization of Posttranslational Modifications of Proteins by MALDI Ion Trap Mass Spectrometry"; *Anal. Chem.*, vol. 69, No. 19, pp. 4002–4009, Date of Publication: Oct. 1, 1997; Place of Publication: United States.

Author: Qin et al.; Title: "Matrix–Assisted Laser Desorption Ion Trap Mass Spectrometry: Efficient Trapping and Ejection of Ions" *Analytical Chemistry*, vol. 68, No. 13, pp. 2102–2107; Date of Publication: Jul. 1, 1996; Place of Publication: United States.

Author: Qin et al.; Title: "Matrix–Assisted Laser Desorption Ion Trap Mass Spectrometry: Efficient Isolation and Effective Fragmentation of Peptide Ions" *Analytical Chemistry*, vol. 68, No. 13, pp. 2108–2112; Date of Publication: Jul. 1, 1996; Place of Publication: United States.

Author: Jonscher et al.; Title: "The Whys and Wherefores of Quadrupole Ion Trap Mass Spectrometry"; Date of Publication: Unknown; Place of Publication: Internet.

Author: Qin et al.; Title: "A Practical Ion Trap Mass Spectrometer for the Analysis of Peptides by Matrix–Assisted Laser Desorption/Ionization" *Analytical Chemistry*, vol. 68, No. 10, pp. 1784–1791; Date of Publication: May 15, 1996; Place of Publication: United States.

Author: Jonscher et al.; Title: "Mixture Analysis Using a Quadrupole Mass Filter/Quadrupole Ion Trap Mass Spectrometer" *Analytical Chemistry*, vol. 68, No. 4, pp. 659–667; Date of Publication: Feb. 15, 1996; Place of Publication: United States.

Author: Jonscher et al.; Title: "Matrix–assisted Laser Desorption of Peptides and Proteins on a Quadrupole Ion Trap Mass Spectrometer", *Rapid Communications in Mass Spectrometry*, vol. 7, pp. 20–26; Date of Publication: Unknown but copyrighted in 1993; Place of Publication: United States.

Author: Kofel et al.; Title: "A Novel Quadrupole, Quistor, Quadrupole Tandem Mass Spectrometer" *Organic Mass Spectrometry*, vol. 26, pp. 463–467; Date of Publication: Unknown but Copyrighted in 1991; Place of Publication: United States.

Bio–CD Advertisement "BIO–CDTM: compact disc platform for DNA detection"; Date of Publication: Unknown; Place of Publication: Unknown.

Title: Burstein Laboratories, Inc. Advertisement; Date of Publication: Unknown; Place of Publication: Unknown.

Author: Loboda et al.; Title: "Novel LINAC II electrode Geometry to Create an Axial field in a Multiple Ion Guide"; Date of Publication: Unknown; Place of Publication: Unknown.

* cited by examiner

METHOD AND SYSTEM FOR MASS SPECTROSCOPY

GOVERNMENTAL SUPPORT

The research leading to the present invention was supported, at least in part, by NIH Grant No. RR 00862. Accordingly, the Government may have certain rights in the invention.

BACKGROUND OF THE INVENTION

The present invention relates to the art of mass spectroscopy, and in particular, to a method and system for high sensitivity, rapid, high efficiency mass spectroscopy.

It is known in the field of mass spectroscopy to provide spectrometers with an elongated conductor having multipole conductors which act as ion transmitters. In PCT Publication WO 99/38185 (the contents of which is incorporated herein by reference), a method and apparatus are disclosed for providing ion transmission between an ion source and a spectrometer. The ion transmission device includes a multipole rod set and a damping gas which dampens spatial and energy spreads of ions generated by a pulsed ion source. The multipole rod set has the effect of guiding the ions along an ion path so that they can be directed to the inlet of a mass spectrometer.

The WO '185 publication discloses a MALDI (matrix-assisted laser desorption/ionization) ion source for producing a small jet of matrix and analyte molecules and ions and which have a wide range of energy spreads. The ion transmission device of WO '185 spreads out the generated ions along the multipole ion guide axis to provide a quasi-continuous beam while i) reducing the energy spread of ions emitted from the source and ii) at least partially suppressing unwanted fragmented analyte ions. These ions are delivered to a time-of-flight spectrometer or other spectrometers.

The apparatus described in WO '185 provides that single multiple rod sets or two or more rod sets can be used. Regardless of the number of rod sets used or the number of rods provided therein, the conductors merely provide ion guidance and possible energy damping by way of collision with a damping gas within the ion guide itself. No provision is made to enhance the efficiency or improve the speed of movement while retaining integrity of the ion beam sent to a mass spectrometer.

Another disclosure, U.S. Pat. No. 6,111,250 to Thomson, et al., discloses a mass spectrometer which includes rod sets constructed to create an axial field, e.g., a DC axial field. The Thomson, et al. '250 disclosure provides for speeding the passage of ions through an ion guide and causing the ions to be fragmented. The ion source is disclosed as being an electrospray or ion spray device such as those described in U.S. Pat. Nos. 4,935,624 and 4,861,988, or a corona discharge needle or a plasma, as shown in U.S. Pat. No. 4,861,965. The ions are directed and their speed controlled for introduction into a "time-of-flight" mass analyzer. In one embodiment, Thomson, et al. disclose the use of a set of auxiliary rods in combination with a set of quadrupole rods for the purpose of, among other things, introducing very low energy ions into a quadrupole mass analyzer. There is no disclosure by Thomson, et al. regarding transmitting intact analyte ions as a substantially continuous ion beam for highly sensitive, rapid mass analysis.

While there are numerous disclosures relating to the art of mass spectroscopy of analyte ions, there is an ever increasing demand for high speed and accurate mass spectroscopy of specimens, especially dilute specimens having only trace amounts of analyte ions. It is the purpose of the present invention to meet this and other needs in the art of mass spectroscopy.

SUMMARY OF THE INVENTION

The present invention is a method and system for determining the ratio of mass to charge of an analyte ion. According to the present invention, intact analyte ions are prepared from a sample by pulse ionizing using a pulse ionizer, e.g., preferably by matrix-assisted laser desorption/ionization (MALDI).

The present invention further includes simultaneously damping and linearly accelerating intact ions in a co-linear ion guide/accelerator to reduce the energy spread of the ions without fragmenting them and to linearly accelerate the ions to provide a substantially continuous beam of intact ions. This dual functionality step of the process in the system is implemented by co-linearly arranged multipole rods and accelerator rods which define an axial ion path along which the continuous ion beam travels. This step of the process and the system also includes a damping gas which acts to reduce the energy spread of the ions. While the pressure of the damping gas can range from 0.1 mTorr to 10 Torr, it is preferably from about 10 mTorr to about 1000 mTorr, and most preferably from about 50 mTorr to about 100 mTorr.

In a preferred embodiment of the present process and system, an additional ion guide can be provided for receipt of the ion beam resulting from the simultaneous damping and linear acceleration and further directing such beam to mass analysis. Preferably the additional ion guide is provided with a multipole ion guide having at least about eight ion guide rods.

Finally, the present invention includes a determination of mass to charge ratio of the substantially intact analyte ions provided from the previous step(s). In a preferred embodiment the determination of mass to charge ratio is conducted in an ion trap spectrometer. The invention is ideally suited for high-efficiency rapid ion trap spectroscopy.

The present invention provides a highly sensitive instrument for detection of analyte ions, e.g., peptides, in a concentration at the subfemtomole level. The present invention provides true MSMS capabilities which enable one to perform multiple MSMS experiments within very short periods of time. Moreover, the process and system of the present invention provide a high degree of accuracy even at extremely diluted levels and at unexpectedly high speed.

For a better understanding of the present invention, together with other and further objects, reference is made to the following description, taken in conjunction with the accompanying drawings, and its scope will be pointed out in the claims which follow.

BRIEF DESCRIPTION OF THE DRAWINGS

Preferred embodiments of the invention have been chosen for purposes of illustration and description and are shown in the accompanying drawings, wherein.

DESCRIPTION OF THE PREFERRED EMBODIMENTS

Figure 1:
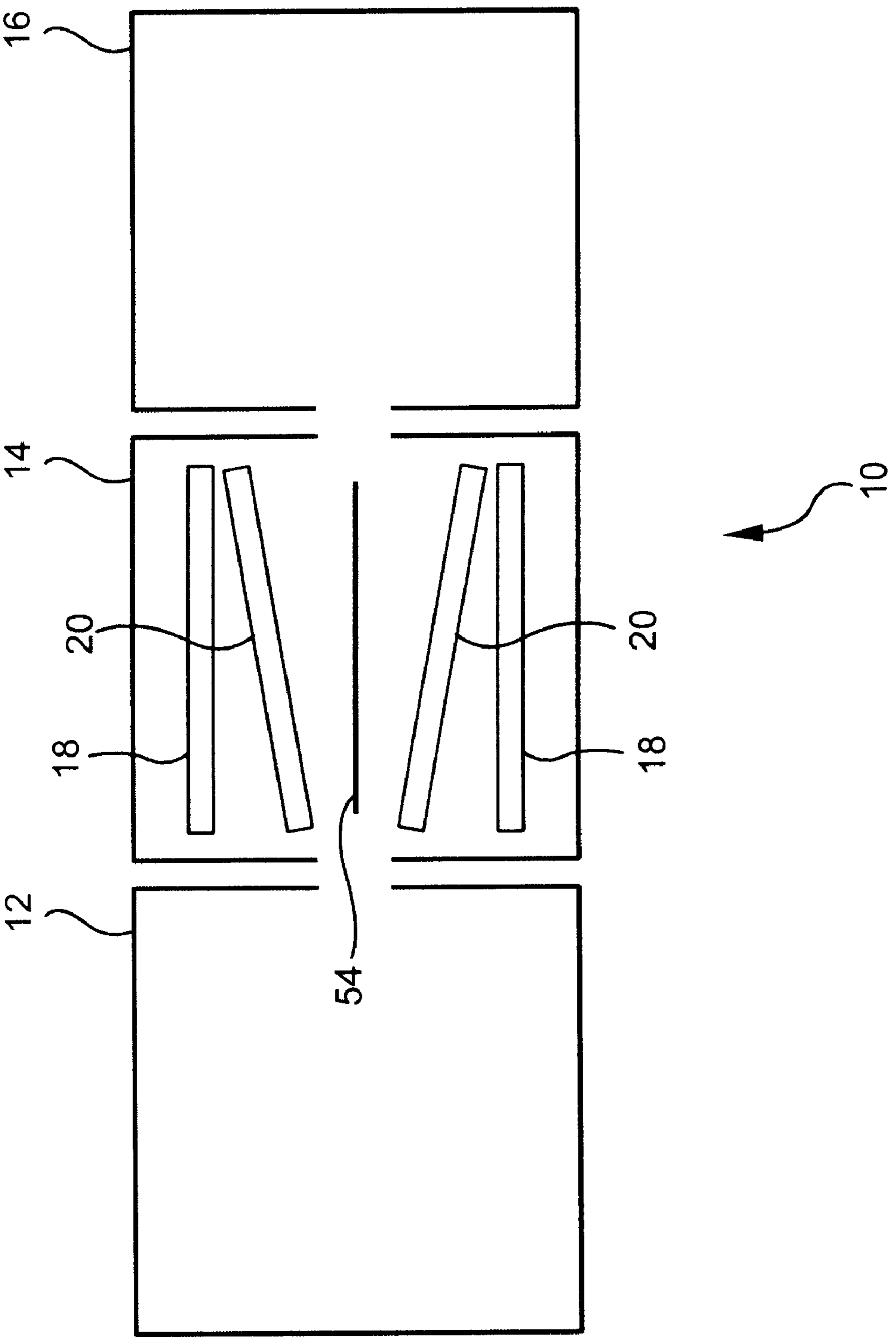
FIG. 1 illustrates a block diagram of a system for mass spectroscopy in accordance with the present invention.

Referring now to FIG. 1, a system for mass spectroscopy 10 in accordance with the present invention is illustrated as a block diagram. The system for mass spectroscopy 10 includes a pulsed ionizer 12, an ionguide/accelerator 14, and a mass analyzer 16. The pulsed ionizer 12 is preferably a matrix assisted laser desorption device that ionizes a sample to form analyte ions. The ionguide/accelerator 14 is interfaced with the pulsed ionizer 12 for receiving desorbed intact analyte ions from the sample to simultaneously dampen and linearly accelerate the intact ions in the substantial absence of fragmentation of the ions to provide a substantial continuous beam of the intact ions for mass analyses. Preferably the ionguide/accelerator 14 includes a multipole rod set 18 and an accelerator rod set 20 in a collinear arrangement in the presence of high pressure gas. The mass analyzer 16 is connected to the ionguide/accelerator 14 for receiving the beam of ions and to determine the mass charge ratio of the intact ions.

Figure 2:
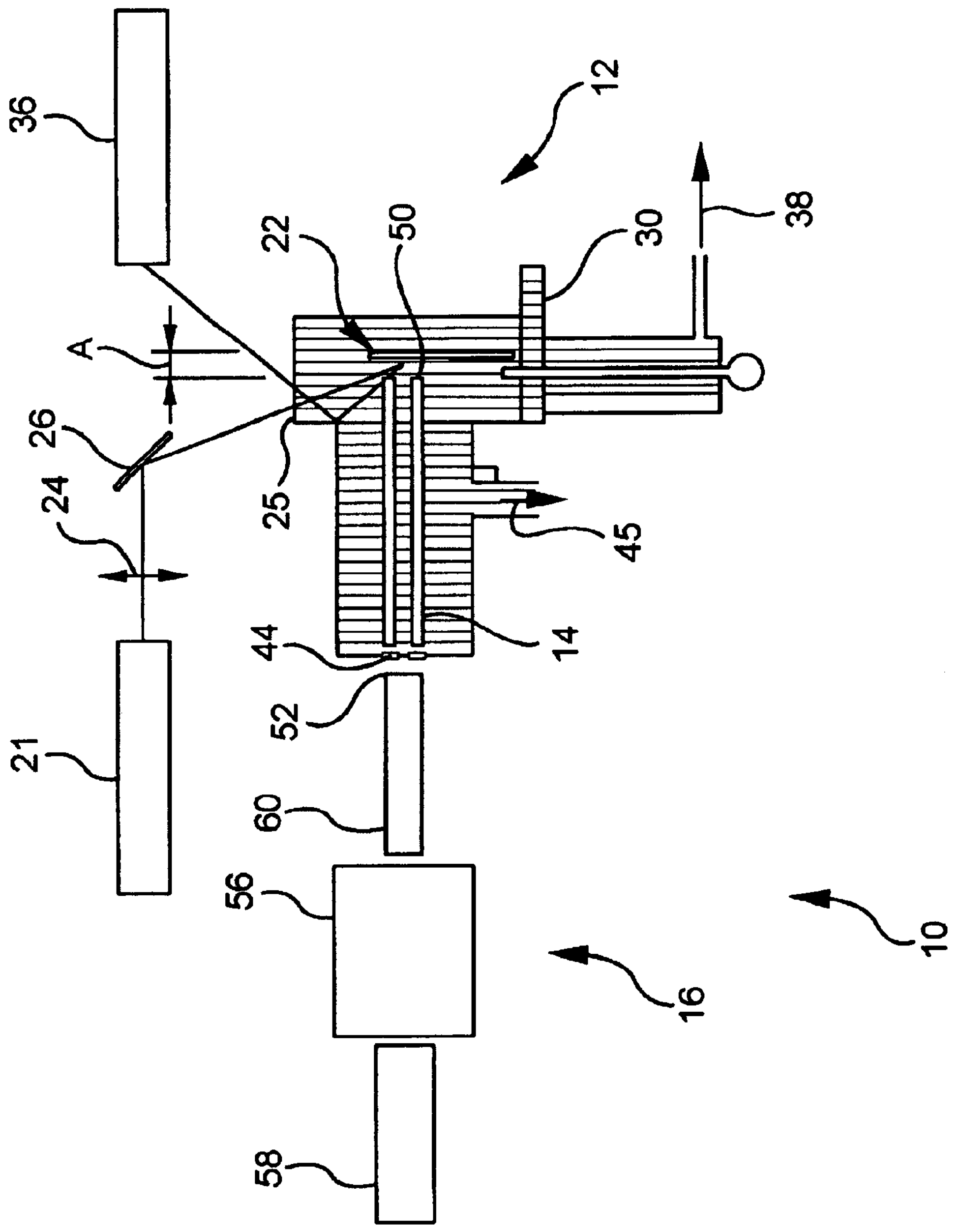
FIG. 2 is a schematic diagram of a first embodiment of the present invention.

Referring now to FIGS. 2 through 5, a first preferred embodiment of the system for mass spectroscopy 10 according to the present invention is illustrated. The first embodiment includes a matrix assisted laser desorption ionization (MALDI) pulsed ionizer 12 and ionguide/accelerator 14 configured to cooperate with a mass analyzer 16, such as the mass analyzer of a commerically available Finnigan LCQ ion trap mass spectrometer as shown in FIG. 2. While, the Finnigan LCQ mass spectrometer is generally equipped with an electro spray ionization device (ESI) when sold to consumers, in the first embodiment shown herein the ESI device was removed to accomodate the pulsed ionizer 12 and ionguide/accelerator 14. It is also possible to configure the device to accommodate both ESI and MALDI.

Figure 6:
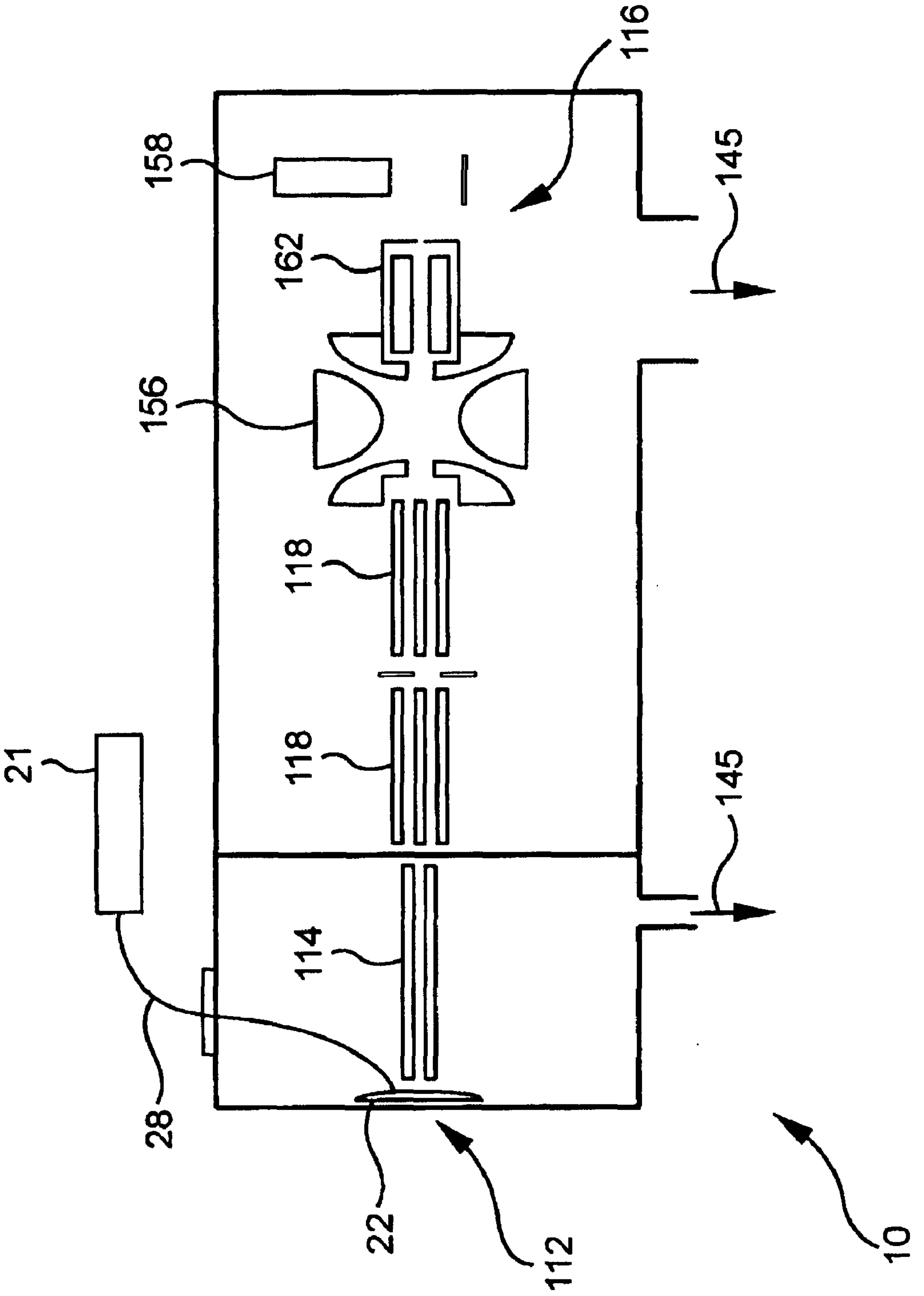
FIG. 6 is a schematic diagram of a second embodiment of the present invention.

Referring now to FIG. 2, the MALDI pulsed ionizer 12 includes a laser 21 configured to pulse a sample located on a substrate 22. Any pulsed laser that can produce ions from a sample for mass spectrometry can be used. The laser 21 is preferably a nitrogen laser. As known in the art, the laser may be focused at the sample on the substrate 22 by various optical components, examples of which are shown in FIGS. 2 and 6. A suitable laser is the VSL-337 Nitrogen Laser manufactured by Laser Science, Inc. of Franklin, Mass. which operates at a repletion rate of 10–20 Hz. The laser 21 can also be a Nd: YAG laser. In FIG. 2, the laser 21 is focused on the sample through a lens 24 and a mirror 26. Preferably the lens collimates the laser beam and has a focal length of about 1 mm to about 1 meter, preferably about 50 cm. The mirror 26 directs the collimated laser beam through a window 25 towards the surface of the substrate 22 at an angle of about 10 degrees to about 80 degrees, preferably about 60 degrees to the normal of the substrate 22. Preferably the laser beam has a laser spot diameter on the surface of a sample from about 0.3 mm to about 0.5 mm. Preferably the power density of laser radiation in the spot is about $10^7$W/cm$^2$. The mirror 26 is preferably configured to be "wobbled" in order to scan the sample with the laser beam. Alternatively as shown in FIG. 6, the laser 21 can be focused on the sample located on the substrate 22 through an optical fiber 28.

The sample is supported on a substrate 22. Various substrates are known in the art to be useful. For example, the substrate may be made of a plastic material, preferably a polycarbonate surface such as that found in a commercially available compact disc.

Figure 5:
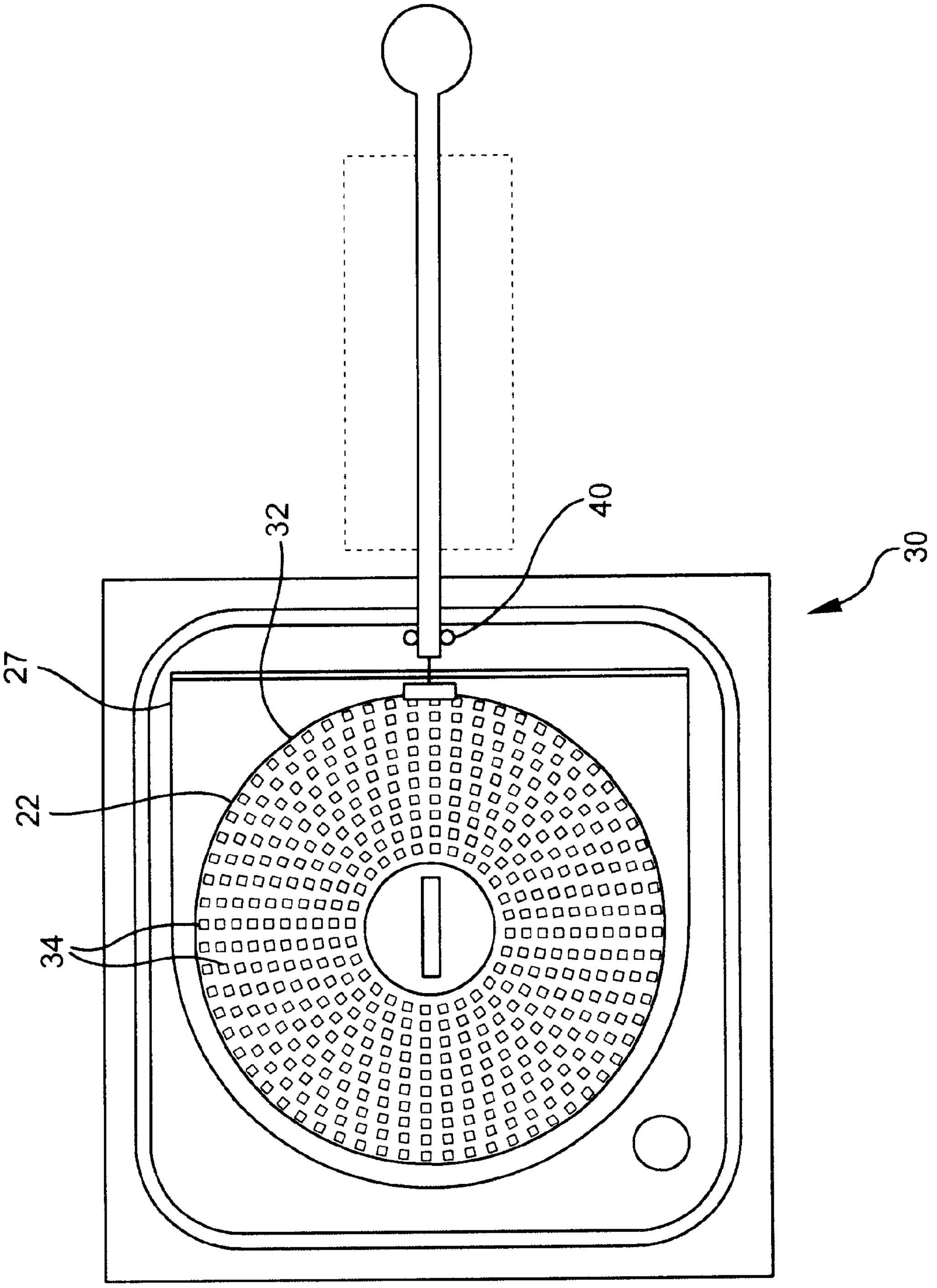
FIG. 5 is a plan view of a sample introduction system for use with the present invention.

Referring now to FIGS. 2 and 5, preferably the first embodiment of the mass spectroscopy system 10 includes a sample introduction system 30 such as that disclosed in Andrew Krutchinsky's and Brian Chait's co-pending U.S. patent application Ser. No. 09/737,660 entitled "High Capacity and Scanning Speed System for Sample Handling and Analysis" filed on Dec. 15, 2000, the disclosure of which is incorporated herein by reference. The sample introduction system 30 generally includes a support plate 27 configured to support a substrate in the form of a compact disc 32 for holding a plurality of samples 34 as shown in FIG. 5. The sample introduction system 30 preferably includes a video camera 36 for monitoring the sample during the pulsed ionizing by the laser 21 as shown in FIG. 2. Preferably the sample introduction system 30 is connected to a pump (not shown herein) via vacuum line 38 which maintains a vacuum lock between the pump and the system 30 such as by use of an O-ring 40 shown in FIG. 5.

Referring to FIG. 5, the plurality of samples 34 located on the compact disc 32 are preferably formed by dissolving a compound to be analyzed in a solution containing a large molar excess of a matrix forming material that efficiently absorbs the light of the laser 21. A small amount of the solution is then deposited on the compact disc 32 and dried to form a sample 34. The samples 34 can be deposited on the compact disc 32 in a variety of known methods including spraying as an aerosol, ultrasonically, or by using a micropipette or fine needle. Preferably, the plurality of samples 34 are discretely deposited over the surface of the compact disc 32 as shown in FIG. 5. The location of each sample 34 can be tracked for use with a high speed compact disc drive to enable the analysis of an extremely large number of samples within a short period of time. During the analysis, the matrix absorbs the energy from the laser pulse resulting in the vaporization and ionization of the sample.

Figure 4:
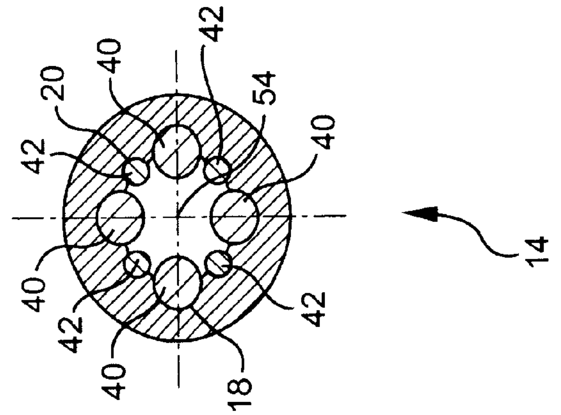
FIG. 4 is a cross sectional view taken along line 4—4 in FIG. 3 showing a multipole rod set and an accelerator rod set.
Figure 3:
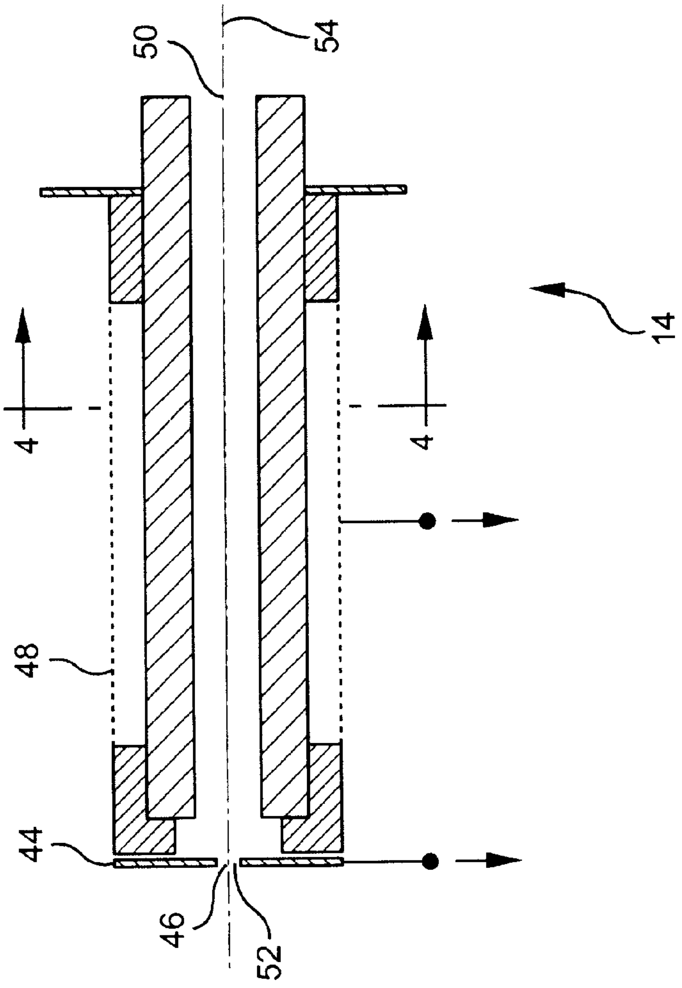
FIG. 3 is an exploded view of the ionguide/accelerator of the present invention.

Referring now to FIGS. 3 and 4, the ionguide/accelerator 14 preferably includes a multipole rod set 18 and an accelerator rod set 20 in a collinear arrangement in the presence of high pressure gas. That is, both the multipole rod set 18 and an accelerator rod set 20 are preferably symmetrically arranged about an axis 54 of the ionguide/accelerator 14 as shown in FIG. 4. The high pressure gas is maintained generally from about 0.1 mTorr to about 10 Torr by a pump represented as arrow 45 in FIG. 2. Preferably the high pressure gas is maintained from about 10 m Torr to about 1000 m Torr, and most preferably from about 50 m Torr to about 100 m Torr. The presence of the high pressure gas provides collisional damping for reducing the energy spread of the desorbed ions without substantial fragmentation. Preferably the ionguide/accelerator 14 is arranged spatially at a distance, A, of not greater than about 2.0 cm from the source of ions for entry of analyte ions, which is generally measured from the substrate 22 as shown in FIG. 2. Preferably the spatial distance is from about 0.1 mm to about 1 cm, and most preferably from about 0.8 mm to about 1.2 mm. Referring to FIG. 3, preferably the ionguide/accelerator 14 includes a plate 44 at an opposite end of the source of ions formed with an aperture 46 having a dimension, e.g., a diameter, from about 0.1 cm and to about 2 cm. Preferably the dimension of the aperture 46 is from about 0.2 cm to about 1.0 cm, and most preferably is about 0.3 cm. Preferably the aperture 46 is circular. The ionguide/accelerator 14 preferably includes an ion guide screen 48.

The multipole rod set 18 confines the ions and preferably includes at least four (4) ion guide rods 40 symmetrically arranged about the axis 54. The multipole rod set 18 can be configured to include more than four (4) ion guide rods 40. For example, the multipole rod set 18 could include eight (8) ion guide rods 40 to be configured in a similar manner as an octopole. Preferably each ion guide rod 40 has a length in a range from about 1 cm to about 100 cm and has a largest cross-sectional dimension, e.g., a diameter, in a range from about 0.1 cm to about 2 cm. The length of each ion guide rod 40 is preferably from about 10 cm to about 40 cm and most preferably from about 18 cm to about 22 cm. The cross-sectional dimension of each ion guide rod 40 is preferably from about 0.2 cm to about 1 cm and most preferably from about about 0.50 cm to about 0.8 cm. Preferably each ion guide rod 40 has a circular cross section.

The accelerator rod set 20 provides an electrical force to drag the ions towards the exit of the ion guide 14 and preferably includes at least four (4) accelerator rods 42 symmetrically arranged about the axis 54. The accelerator rod set 20 can be configured to include more than four (4) accelerator rods 42. For example, the accelerator rod set 20 could include eight (8) accelerator rods 42. The accelerator rods 42 are arranged closer to the axis 54 of the ion guide 14 at the entrance 50 and further from the axis 54 at the ion guide 14 exit 52. Preferably each accelerator rod 42 has a length in a range from about 1 cm to about 100 cm and has a largest cross-sectional dimension, e.g., diameter, in a range from about 0.1 mm to about 2 cm. The length of each accelerator rod 42 is preferably from about 10 cm to about 40 cm and most preferably from about 16 cm to about 20 cm. The cross-sectional dimension of each accelerator rod 42 is preferably from about 0.1 cm to about 1 cm and most preferably from about 0.25 cm to about 0.5 cm. Preferably each accelerator rod 42 has a circular cross section.

In operating the ionguide/accelerator 14, the multipole rod set 18 is preferably driven by an independent RF power supply to generate a sine wave amplitude from about 1 V to about 10,000 V. Preferably the amplitude is in the range from about 100 V to about 1000 V, and most preferably from about 300 V to about 500 V. The power supply can include a 500 kHz crystal oscillator-controlled sine wave generator and a power amplifier such as Model No. 240L of ENI, Rochester, N.Y. The multipole rod set 18 can also be operated as a mass filter by applying DC voltages from about −50 V to about +50 V while providing the necessary offset from about 15 V to about 25 V. Both the plate 44 and ion guide screen 48 are grounded as shown in FIG. 3. The voltage applied to the accelerator rod set 20 creates a small electrical field along the axis 54 of the ion guide 14 because of the changing proximity of the accelerator rods 42 to the axis 54 of the ion guide 14 that drags the desorbed ions along the axis 54. Preferably, a constant voltage is applied to the accelerator rod set 20 from about 1 V to about 10,000 V. The accelerator rod set voltage can be in the range from about of 100 V to about 1000 V, and preferably is about 100 V. Although MALDI spectra can be obtained when the substrate 22 is isolated and no potential is applied to the support plate 27, preferably about 200 V is applied to the support plate 27 for the optimum recording of MALDI spectra.

Referring now to FIG. 2, the mass analyzer 16 preferably includes an ion trap 56 and a detector 58. In the first embodiment of the present invention, the mass analyzer 16 utilizes the ion trap 56 and the detector 58 configuration of the commerically available Finnigan LCQ ion trap mass spectrometer (hereinafter "Finnigan mass spectrometer"). The Finnigan mass spectrometer also includes an octopole 60 which interfaces with the ionguide/accelerator 14.

Figure 8:
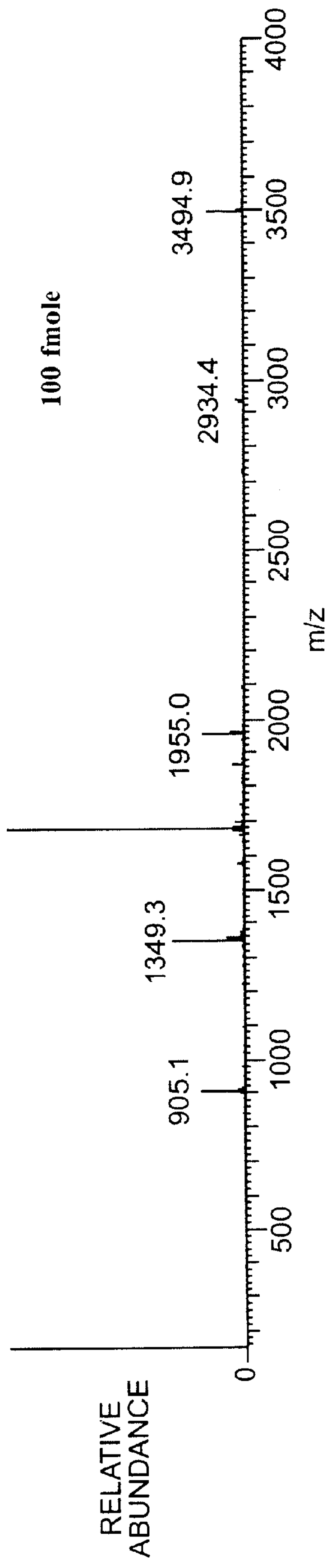
FIG. 8 illustrates a mass spectra of a six peptide mixture acquired in about 2 seconds for a sample amount of 100 fmole.
Figure 9:
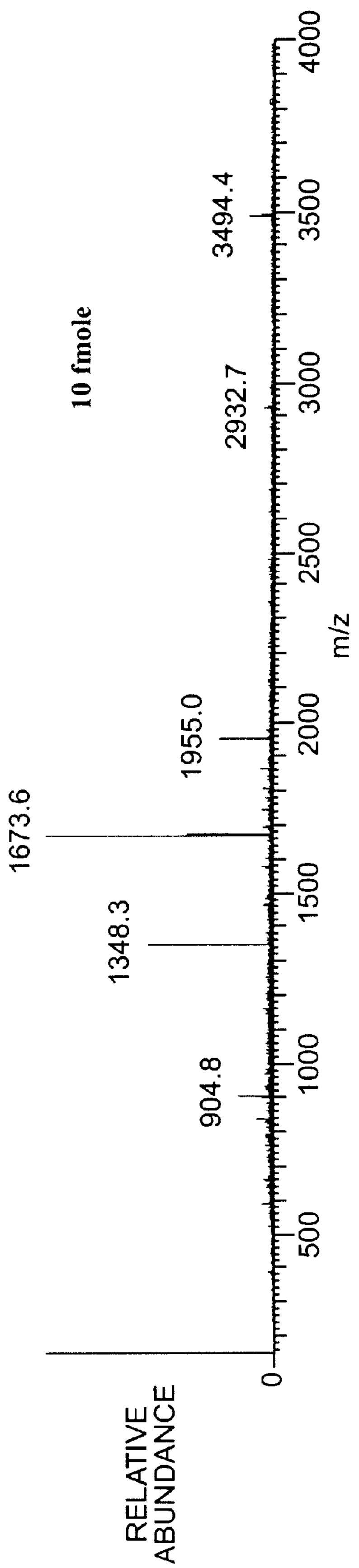
FIG. 9 illustrates a mass spectra of a six peptide mixture acquired in about 2 seconds for a sample amount of 10 fmole.
Figure 10:
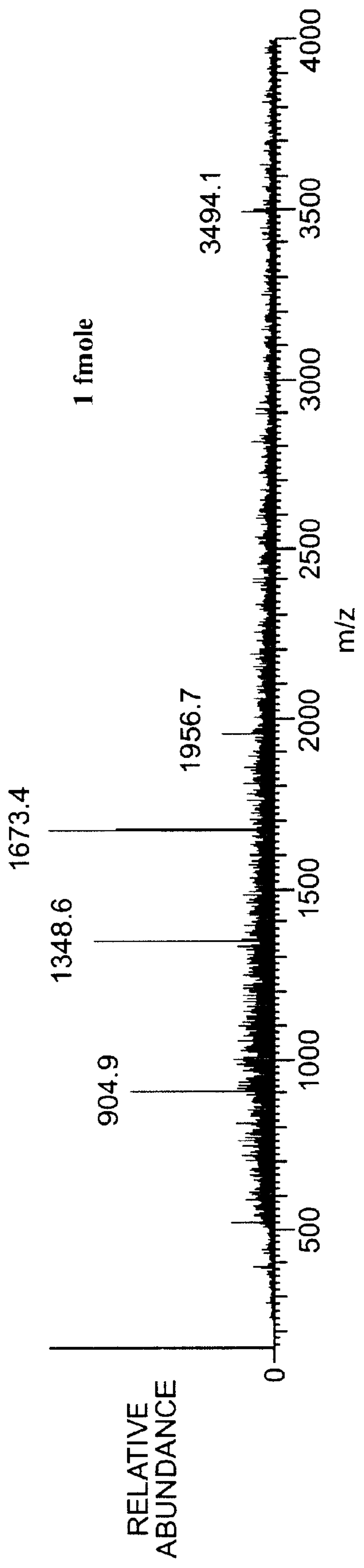
FIG. 10 illustrates a mass spectra of a six peptide mixture acquired in about 2 seconds for a sample amount of 1 fmole.

FIGS. 8 through 10, illustrate the MALDI spectra of samples obtained from a mixture of six peptides at an equimolar concentration of 100 fmol/μl in a solution of 60/35/5 MeOH/water/acetic acid as well as dilutions thereof at respectively 10 fmol/μl and 1 fmol/μl. The sample analyzed for FIGS. 8, 9, and 10 respectively contained 100, 10 and 1 fmole of each peptide. The sample matrix solutions were prepared by depositing the solution onto the polycarbonate surface of the compact disc 32 and allowed to dry. The samples were bombarded with a collimated nitrogen laser beam having a diameter between 0.3 and 0.5 mm and a power density of about $10^7$W/cm$^2$ while applying about 200 V to the support plate 27. The desorbed ions were introduced into the ion guide/accelerator 14 for simultaneously damping by high pressure gas at about 65 mTorr and dragging the ions with the accelerator rod set 20. A constant voltage of about 100 V was applied to the accelerator rod set 20, and about 400 V was applied to the multipole rod set 18. The mass analyzer 16 of the Finnigan LCQ was operated in substantially the traditional intended manner for analyzing the ions. The MALDI spectra reproducibly exhibited ion signals from all six components of the peptide mixture, even for the sample having only 1 fmole of each peptide. All spectra were acquired in about 2 seconds.

Figure 11:
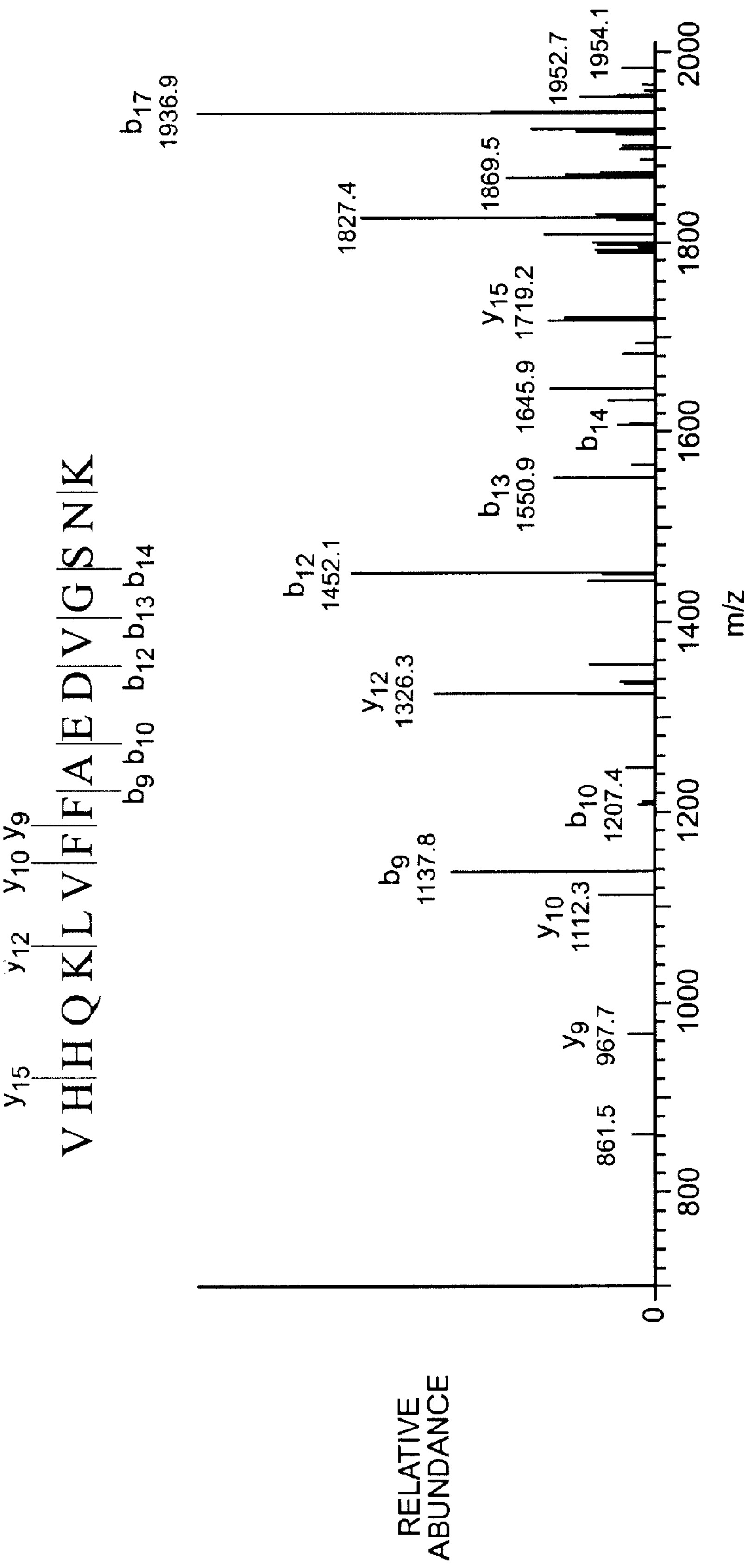
FIG. 11 illustrates a MS/MS spectrum of an ion at m/z 1956.7 selected from the spectrum of the 1 fmole peptide mixture corresponding to FIG. 10 that was acquired in about 2 seconds.

Referring now to FIG. 11, the MS/MS spectrum of the peptide at 1956.7 m/z selected from the MALDI spectrum of the 1 fmole peptide mixture shown in FIG. 10 is shown. This fragmentation spectrum was also acquired in about 2 seconds. Almost all major peaks in the spectrum can be identified as b or y-type fragments of the peptide.

Figure 7:
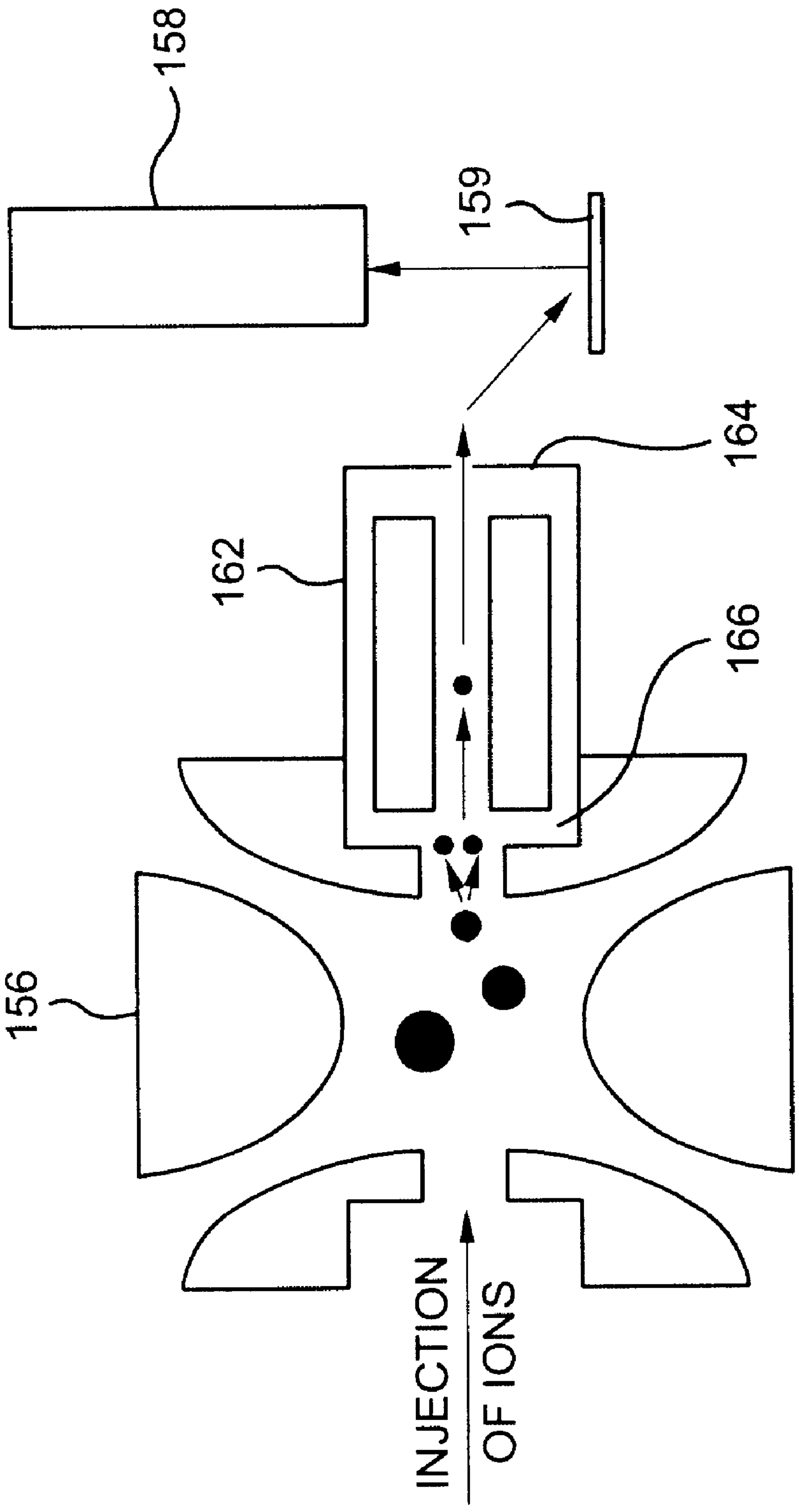
FIG. 7 is an exploded schematic diagram showing the quadrupole positioned between the ion trap and the detector of the second embodiment of the present invention.

Referring now to FIGS. 6 and 7, a second preferred embodiment of the system for mass spectroscopy 100 according to the present invention is illustrated. The second embodiment includes a matrix assisted laser desorption ionization (MALDI) pulsed ionizer 112, an ionguide/accelerator 114, and a mass analyzer 116 all in a substantially collinear arrangement. Both the ionguide/accelerator 114, and a mass analyzer 116 are subjected to a vacuum as represented by arrows 145 in FIG. 6. Preferably the second embodiment of the system 10 also includes at least one additional multipole 118 located between the ionguide/accelerator 114 and the mass analyzer 116. The multipole 118 can be any type including a quadrupole or an octopole. The matrix assisted laser desorption ionization (MALDI) pulsed ionizer 112 and the ionguide/accelerator 114 are preferably configured in a similar manner as described above with respect to the first embodiment 10. The ionguide/accelerator 114 can be configured as a flexible device built from metallic springs or flexible metallized rods for use as a "sniffing" type of a sample scanning system as disclosed in U.S. application Ser. No. 09/737660. The details of the mass analyzer 116 are shown in FIG. 7 and will now be described below.

Referring now to FIG. 7, the mass analyzer 116 preferably includes a quadrupole ion trap 156 and a detector 158 interfaced by a second ionguide/accelerator 162. The detector 158 includes a conversion plate 159 for converting ions to secondary charged particles received from the exit end 164 of the second ionguide/accelerator 162. The secondary charged particles include electrons and ions. The second ionguide/accelerator 162 is configured in a similar manner as the first ionguide/accelerator 14 and includes a first end 166 that is preferably coupled to the exit of the quadrupole ion trap 156. In this embodiment, the second ionguide/accelerator 162 provides for the efficient transport of ions from the quadrupole ion trap 156 to the detector 158. The second ionguide/accelerator 162 can also be operated as a mass filter as described above with respect to the first ionguide/accelerator 14 for selecting a subset of ions ejected from the quadrupole ion trap 156 to the detector 158.

The operation and advantages of the second ionguide/accelerator 162 will now be explained with reference to FIG. 7 where the flow of ions is depicted by arrows. The ion trap 156 operates in its original mode admitting the injected ions and collisionally cooling them. After some time, the ejection process from the ion trap 156 starts. The ejection of ions from the trap 156 is usually achieved by changing the amplitude of RF potential applied to the trap (by using a so called instability scan). The increased RF field inside of an ion trap makes the trajectory of some ions with a particular mass-to-charge ratio unstable such that these ions are caused to hit the walls or leave through one of the holes in the ion trap electrode. The process of ion ejection also causes the kinetic energy of the ejected ions to increase so that there is a greater chance that the ejected ions will fragment upon collision with buffer gas molecules present in the ion trap. With the second ionguide/accelerator 162 it is possible to select some particular fragment of the ejected ions. In this way only those ejected ions that produce a particular fragment will be capable of going through the second ionguide/accelerator 162 to the detector 158 using the well known "linked scan" mode of detection. Thus it may be possible to measure the spectrum of only those ions that undergo a particular fragmentation, but with very high efficiency.

Different types of so-called "link scans" can be performed with this instrument, including neutral ion losses scan, parent ion scan etc. In the proposed device, these types of scans can be performed with much greater efficiency compared with those carried out on existing instruments (e.g., the triple quadrupole mass spectrometer). Because only particular ions are ejected from the ion trap at a given ejection time, other ions are left in the ion trap to be ejected at different time. Thus no losses are expected because all ions undergo the same linked scan analysis during the total ion ejection analysis scan.

Thus, while there have been described what are presently believed to be the preferred embodiments of the invention, those skilled in the art will realize that changes and modifications may be made thereto without departing from the spirit of the invention, and is intended to claim all such changes and modifications as fall within the true scope of the invention.

We claim:

1. A method of determining the ratio of mass to charge of an ion comprising:

a. pulsed ionizing intact analyte ions from a sample to be analyzed;

b. simultaneously damping and linearly accelerating said intact ions within a high pressure co-linear ion guide/accelerator having a length, said damping and linearly accelerating occurring along the entire length of said high pressure co-linear ion guide/accelerator to reduce energy spread of said ions substantially without fragmentation and to provide a substantially continuous beam of said ions; and c. determining ratio of mass to charge of said ions.

2. A method according to claim 1, wherein said pulsed ionizing intact analyte ions comprises matrix-assisted laser desorption/ionization (MALDI).

3. A method as described in claim 2, wherein said intact analyte ions resulting from step (a) are collected by spatially arranging said high pressure co-linear ion guide/accelerator sufficiently proximal to said ion generation to cause entry therein of a substantial number of said analyte ions in the absence of required ionic acceleration while permitting continued pulsed ionization.

4. A method as described in claim 3, wherein said spatial arrangement includes locating said ion guide/accelerator at a distance from an ionization source of not greater than about 2 cm and fixing an aperture at an opposite end of said ionization source.

5. A method as described in claim 4, wherein said distance is from about 0.1 mm to about 1 cm.

6. A method as described in claim 5, wherein said distance is from about 0.8 mm to about 1.2 mm.

7. A method as described in claim 4, wherein said aperture has a dimension of from about 0.1 cm to about 2 cm.

8. A method as described in claim 7, wherein said dimension is of from about 0.2 cm to about 1.0 cm.

9. A method as described in claim 8, wherein said dimension is about 0.3 cm.

10. A method as described in claim 1, wherein said simultaneous damping and accelerating comprises subjecting said intact analyte ions to damping gas through a linear path defined by said high pressure co-linear ion guide/accelerator while linearly accelerating said ions through said linear path.

11. A method as described in claim 10, wherein said high pressure co-linear ion guide/accelerator includes a multipole ion guide within a pressurized gas environment.

12. A method as described in claim 11, wherein said gas is maintained at a pressure of from about 0.1 mTorr to about 10 Torr.

13. A method as described in claim 12, wherein said pressure is from about 10 mTorr to about 1000 mTorr.

14. A method as described in claim 13, wherein said pressure is from about 50 mTorr to about 80 mTorr.

15. A method as described in claim 11, wherein said multipole ion guide comprises at least about four (4) ion guide rods.

16. A method as described in claim 11, wherein said multipole ion guide comprises guide rods having a length of from about 1 cm to about 100 cm.

17. A method as described in claim 16, wherein said length is from about 10 cm to about 40 cm.

18. A method as described in claim 17, wherein said length is from about 18 cm to about 22 cm.

19. A method as described in claim 11, wherein said multipole ion guide comprises guide rods having a greatest cross-sectional dimension of from about 0.1 cm to about 2 cm.

20. A method as described in claim 19, wherein said dimension is from about 0.2 cm to about 1.0 cm.

21. A method as described in claim 20, wherein said dimension is from about 0.5 cm to about 0.8 cm.

22. A method as described in claim 11, wherein said linear acceleration is provided by charged accelerator rods arranged co-linearly with said multipole ion guide to provide linear acceleration of said substantially continuous ion beam toward said mass to charge determination.

23. A method as described in claim 22, wherein there are at least about four (4) accelerator rods.

24. A method as described in claim 22, wherein said accelerator rods have a length from about 1 cm to about 100 cm.

25. A method as described in claim 24, wherein said length is from about 10 cm to about 20 cm.

26. A method as described in claim 25, wherein said length is from about 16 cm to about 20 cm.

27. A method as described in claim 22, wherein the greatest cross-sectional dimension of said accelerator rods is from about 0.01 mm to about 2 cm.

28. A method as described in claim 27, wherein said dimension is from about 0.01 cm to about 1 cm.

29. A method as described in claim 28, wherein said dimension is from about 0.25 cm to about 0.50 cm.

30. A method as described in claim 1, wherein determining said ratio of mass to change ratio comprises subjecting said ions to ion trap spectroscopy.

31. A method as described in claim 1, wherein said sample has an amount of analyte ions $10^{-20}$ mole to about $10^{-9}$ mole.

32. A method as described in claim 31, wherein said amount is from about $10^{-18}$ mole to about $10^{-15}$ mole.

33. A method as described in claim 1, wherein a time period for conducting said analysis is not greater than about 10 minutes.

34. A method as described in claim 33, wherein said time period is not greater than about 1 second.

35. A method as described in claim 1, which further comprises directing ions resulting from said simultaneous damping and accelerating to a second ion guide whereby continuity of said ion beam is enhanced.

36. A method as described in claim 35, wherein said second ion guide comprises a multipole ion guide having at least about eight guide rods.

37. A system for determining the ratio of mass to charge of an ion comprising:

a pulsed ionizer which generates intact analyte ions from a sample of matter to be analyzed;

a high pressure co-linear ion guide/accelerator having a length and being interfaced with said pulsed ionizer for non-accelerated receipt of intact ions of said sample, said high pressure co-linear ion guide/accelerator being configured to simultaneously dampen and linearly accelerate the intact ions along the entire length in the substantial absence of fragmentation of said ions to provide a substantially continuous beam of said intact ions for mass analysis; and a mass analyzer connected to said ion guide/accelerator for receipt of said beam of ions which determines the mass to charge ratio of said intact ions.

38. A system as defined in claim 37, wherein said pulsed ionizer is a matrix-assisted laser desorption/ionization (MALDI) device.

39. A system as defined in claim 37, wherein said high pressure co-linear ion guide/accelerator comprises a multipole rod set and an accelerator rod set arranged co-linear in the presence of high pressure gas.

40. A system as defined in claim 39, wherein said high pressure gas is maintained at a range from about 0.1 mTorr to about 10 Torr.

41. A system as defined in claim 40, wherein said range of pressure is from about 10 mTorr to about 1000 mTorr.

42. A system as defined in claim 41, wherein said pressure is from 50 mTorr to about 100 m Torr.

43. A system as defined in claim 39, wherein said ion guide/accelerator is arranged spatially at a distance of not greater than 2.0 cm from said pulsed ionizer for entry of analyte ions and includes an aperture at an opposite end of said pulsed ionizer.

44. A system as defined as in claim 43, wherein said distance is from about 0.1 mm to about 1.2 cm.

45. A system as defined in claim 44, wherein said distance is from about 0.8 mm to about 1.0 mm.

46. A system as defined in claim 43, wherein said aperture has a dimension of from about 0.1 cm and to about 2 cm.

47. A system as defined in claim 46, wherein said dimension is from about 0.2 cm to about 1.0 cm.

48. A system as defined in claim 47, wherein said aperture is about 0.3 cm.

49. A system as defined in claim 39, wherein said multipole rod set comprises at least about four (4) rods.

50. A system as defined in claim 39, wherein said each of said multipole rods has a length in a range from about 1 cm to about 100 cm.

51. A system as defined in claim 50, wherein said length is from about 10 cm to about 40 cm.

52. A system as defined in claim 51, wherein said length is from about 18 cm to about 22 cm.

53. A system as defined in claim 39, wherein each of said multipole rods has a largest cross-sectional dimension in a range from about 0.1 cm to about 2 cm.

54. A system as defined in claim 53, wherein said dimension is from about 0.2 cm to about 1 cm.

55. A system as defined in claim 54, wherein said dimension is from about 0.50 cm to about 0.8 cm.

56. A system as defined in claim 39, wherein said accelerator rod set comprises at least four (4) rods arranged co-linearly with said multipole rod set.

57. A system as defined in claim 39, wherein each of said accelerator rods has a length of from about 1 cm to about 100 cm.

58. A system as defined in claim 57, wherein said length is from about 10 cm to about 40 cm.

59. A system as defined in claim 58, wherein said length is from about 16 to about 20 cm.

60. A system as defined in claim 39, wherein each of said accelerator rods has a largest cross-sectional dimension of from about 0.1 mm to about 2 cm.

61. A system as defined in claim 60, wherein said dimension is from about 0.1 cm to about 1 cm.

62. A system as defined in claim 61, wherein said dimension is from about 0.25 cm to about 0.5 cm.

63. A system as defined in claim 37, which further comprises a second multipole ion guide situated to receive said ion beam from said ion guide/accelerator and further direct said beam to said mass analyzer.

64. A system as defined in claim 63, wherein said second multipole ion guide comprises at least about eight guide rods.

65. A system as defined in claim 37, wherein said mass analyzer has an ion trap and a detector.

66. A system as defined in claim 65, further comprising a second ion guide/accelerator positioned between the ion trap and the detector.

67. An ion transmission device for mass spectroscopy, said device comprising:

an entrance for receiving ions from a first mass spectroscopy device;

an exit for delivering ions to a second mass spectroscopy device;

an axis extending between said entrance and said exit;

a plurality of ion guide rods for providing guidance to the ions, said plurality of ion guide rods being symmetrically arranged about said axis between said entrance and said exit;

a plurality of accelerator rods for providing acceleration to the ions, said plurality of accelerator rods having a length and being symmetrically arranged about said axis between said entrance and said exit, each of said plurality of accelerator rods being arranged closer to said axis at said entrance than said exit; and means for maintaining said plurality of ion guide rods and said plurality of accelerator rods under high pressure, wherein the ions received from the first mass spectroscopy device are simultaneously dampened by said high pressure and linearly accelerated by said plurality of accelerator rods along said entire length to provide a substantially continuous beam of ions for delivery to the second mass spectroscopy device.

68. An ion transmission device as defined in claim 67, wherein said high pressure is maintained at a range from 0.1 mTorr to 10 Torr.

69. An ion transmission device as defined in claim 67, wherein said high pressure is maintained at a range from about 10 mTorr to about 1000 mTorr.

70. An ion transmission device as defined in claim 67, wherein said high pressure is maintained at a range from about 50 m Torr to about 100 m Torr.

71. An ion transmission device as defined in claim 67, wherein said means for maintaining said high pressure include a pump.

72. An ion transmission device as defined in claim 67, wherein said plurality of accelerator rods includes at least about four (4) accelerator rods.

73. An ion transmission device as defined in claim 72, wherein said plurality of ion guide rods includes at least about four (4) ion guide rods.

* * * * *